United States Patent [19]
Roelofs et al.

[11] 3,713,475
[45] Jan. 30, 1973

[54] SHELL MOLDS

[75] Inventors: Henry M. Roelofs, Chicago; William J. Lafferty, Lansing, both of Ill.

[73] Assignee: Nalco Chemical Company, Chicago, Ill.

[22] Filed: Jan. 4, 1971

[21] Appl. No.: 103,923

[52] U.S. Cl..................164/26, 117/33, 117/DIG. 6
[51] Int. Cl................................................B22c 9/12
[58] Field of Search...................164/23, 24, 25, 26; 117/DIG. 6, 16, 33; 34/9, 95, 12, 57 A

[56] References Cited

UNITED STATES PATENTS

| | | | |
|---|---|---|---|
| 2,948,032 | 8/1960 | Reuter | 164/26 |
| 3,239,942 | 3/1966 | Mink et al. | 34/9 |
| 3,307,232 | 3/1967 | De Fasselle et al. | 164/25 X |

FOREIGN PATENTS OR APPLICATIONS

| | | | |
|---|---|---|---|
| 887,216 | 1/1962 | Great Britain | 34/95 |

*Primary Examiner*—J. spencer Overholser
*Assistant Examiner*—John E. Roethel
*Attorney*—Kinzer, Dorn & Zickert, John G. Premo, Charles W. Connors and Edward A. Ptacek

[57] ABSTRACT

A shell mold characterized by a slip coat and an overlying stucco coat is dried by immersing the shell thus prepared in a fluidized bed of desiccant, whereafter the bed is collapsed to invest the shell with the desiccant.

5 Claims, No Drawings

SHELL MOLDS

This invention relates to the preparation of ceramic shell molds used for the casting of metal.

U.S. Pat. No. 2,948,032, here incorporated by reference, discloses a unique process for producing shell molds by the so-called lost wax process. Instead of wax, a plastic may also be used, both known in the art as an expendable pattern material in that the pattern is ultimately destroyed by thermal melting. Briefly, as a background to the present invention, wax patterns, in a cluster, are joined by a network of runners, gates and sprues representing a "positive" or wax replica of the appearance of the ultimate metal castings. The wax cluster is dipped, until it is thoroughly wetted and covered, in a ceramic slip comprising an aqueous colloidal silica sol in which is suspended granular, fused silica, as disclosed in said patent. After the pattern is thus invested by the slip, the cluster is uniformly stucco-coated (stuccoed) with (dry) granular fused silica and allowed to dry. In other words, the slip itself is invested by the stucco coat. This investment procedure of the slip dip and the stucco coating is repeated nominally for five or six coats (laminations) but up to as many as 12 depending upon the strength required for the ultimate shell mold. Eventually, the expendable pattern is thermally destroyed, that is, the wax is melted out of the shell, producing a hollow network of mold cavities, runners, gates and sprues for accepting the molten metal. The resultant casting is smooth (a precision casting) requiring hardly any machine finishing.

The dry-out step between successive laminations is time-consuming, but it is necessitated by the fact that residual moisture at unacceptable levels will burst the walls of the shell during wax run-out, or will at least produce a weakened, pocked shell unacceptable for casting.

We have found that superior drying, both from the standpoint of time lapse and residual water content, can be achieved by first immersing the stucco-coated cluster in a fluidized bed of a particulate desiccant and then collapsing the bed about the immersed cluster. The result is that the particle of desiccant invests the stucco coat much in the manner of tiny sponges being forced into the pores of the stucco coat, penetrating the stucco coat and reaching to the moisture content of the slip coat. There can be no question that capillary action (absorption) is involved in transferring a wall of water from the interior slip coat outward to the desiccant, chemical absorption is also involved because we observed uniformly a rise in temperature of the coating indicative of heat of hydration which aids in evaporation of the transferred film or wall of water. The desiccant is compatible with both the stucco content and the slip content of the shell coating.

It is therefore an object of the present invention to more efficiently dehydrate shell coatings of the kind involved and to do this by driving a particulate desiccant into the stucco portion of the coating, a desiccant which is compatible with the coating.

Another object of the invention is to dry the shell desiccantly in a fashion which produces an exothermal phenomenon offsetting the drop in temperature ordinarily encountered when water is merely evaporated as heretofore, which at times has produced undesired cracking or crazing of the shell.

Another object of the invention is to avoid flame-drying of mold shells and attendant toxic and polluting hazards as well as dimensional changes which may require compensation.

Another object of the invention is to use a fluidized bed of silica gel as the preferred desiccant and the preferred mode of exposing the shell coating to the desiccant, which combines a desiccant thoroughly compatible with a siliceous shell, which enables inexpensive equipment to be used, and which presents a desiccant easily reactivated.

Another important object of the invention is to develop a process for drying shell molds which can be easily automated, from the start of the slip dip through desiccant drying and back to the next dip.

Other and further objects of the present invention will be apparent from the following description and claims which, by way of illustration, show a preferred embodiment of the present invention and the principle thereof and what is now considered to be the best mode contemplated for applying that principle. Other embodiments of the invention embodying the same or equivalent principles may be used and structural changes may be made as desired by those skilled in the art without departing from the present invention.

The preferred example of practice of the present invention proceeds in accordance with the disclosure of U.S. Pat. No. 2,948,032 insofar as concerns the construction of the shell from a slip and a subsequent stucco coat in an instance where both the slip coat and the stucco coat are essentially of silica, and where the slip itself is a mixture of an aqueous colloidal silica sol having a fused silica refractory dispersed therein.

To produce a suitable ceramic slip combining an aqueous colloidal silica sol and dispersed high silica, low thermal coefficient of expansion silica refractory, it is desirable that the particle size of the silica refractory does not exceed 100 microns nor should it be less than 0.1 micron. The amount of aqueous colloidal silica sol or vehicle used in relationship to the siliceous refractory may be varied over relatively wide range although usually from 20 to 50 percent by weight of the aqueous silica sol material may be used and from 50 to 80 percent by weight of the siliceous refractory. The weight ratio of colloidal silica vehicle to ceramic material usually should be maintained within the weight ratio of 1:1 to 1:3.

The ingredients (sol and silica particles) are mixed using good agitation and are blended to form a homogeneous suspension that should not tend to settle out over a period of time sufficiently long to enable the expendable patterns to be dipped into the mixture. Methods for preparing a suitable sol in the first instance are set forth in said patent incorporated by reference herein.

It is oftentimes desirous to use minor amounts of a wetting agent with the slip to allow the slip to more easily and uniformly coat the expendable pattern. The wetting agent should be compatible with the aqueous colloidal silica sol.

A general formula for ceramic slips of the types thus discussed is presented below:

| Ingredients | Percent by weight |
|---|---|
| A. An aqueous colloidal silica having an $SiO_2$ content of from 12% to 48% by weight | 20–40 |

B. A granular fused silica having a thermal coefficient of expansion of not more than about $6\times10^{-7}$ cm//cm./° C. and a silica content, expressed as $SiO_2$ of at least 97% by weight   60–80
C. A compatible wetting agent   0.01–0.5

While any compatible wetting agent may be used which is compatible with the silica sol, the non-ionic type, such as, for example, amyl alcohol reacted with 5 moles of ethylene oxide, are preferable. Particularly good formulations have been prepared using the triethanol amine salt of dodecylbenzene sulfonic acid. In some cases it is necessary to use minor amounts of a silicone antifoam to prevent foaming which sometimes occurs.

The expendable pattern is dipped into the ceramic slip to produce a thin coating of the slip on the pattern. It is then removed from the slip and coated with the siliceous refractory material to produce a stuccoed finish or coat.

The stucco coat may be dusted, sprayed, or sprinkled on the slip-treated expendable pattern using simple, mechanical means.

To produce satisfactory molds, particularly where ferrous metals are concerned, it is desirable that the stuccoing ceramic material have the particle size within the range from about 50 to 2000 microns, and be of the same siliceous refractory material as that contained in the slip.

It is desirable that the first coat of ceramic placed on the expendable pattern produces a very smooth surface. To achieve this effect, it is beneficial to use a slip having suspended therein very fine particle size ceramic material as well as using a fine particle size stucco coating. Larger particle size slips and stucco coatings may be used for the second and third or subsequent coats without affecting the smooth inner surface of the mold. For instance, the prime coats might be composed of a fused silica having a particle size not in excess of 75 microns in both the slip and stucco coats and the later coats might use fused silica having particle sizes in excess of 150 microns. In using this procedure, as well as the general procedures outlined above, it is beneficial to have a finer particled size fused silica in the slip than the fused silica used as the stucco coat.

More specifically, we prepare a silica sol (30 percent $SiO_2$ by weight) under Example III of U.S. Pat. No. 2,948,032 and disperse therein fused silica particles (no greater than 75 microns) as set forth in Example VI of the same patent, resulting in a theoretical water content of about 50 percent by weight. This constitutes the slip in which the pattern cluster is dipped and moved about under mild agitation until thoroughly invested. The pattern thus coated is next stuccoed, preferably in a fluidized bed of fused silica of particle size no smaller than 95 microns under Example VI of said patent. The water content in the shell (slip coat plus stucco coat) is now about 25 percent, but some of the water will react with the silica sol to form polysilic acid. The remaining water is free or uncombined and is the water content to be removed before constructing the next shell layer, a water content somewhere between 19 and 19.5 percent by weight of the shell.

Practice of the present invention is not limited to a stucco coat entirely of silica refractory, for we have found that the slip may be coated as well with a zircon or alumina-silicate complex such as mullite, a sillimanite, or a mixture thereof deemed equivalents of fused silica.

As noted above, the combined shell, the slip covered or invested by the stucco particles, is to be dried between stages of build-up which may be as many as 12 exposures. This is where we depart from the known practices.

In accordance with the present invention, we subject the shell, at each stage of build-up, to direct contact with a desiccant; and we go further in the sense that we actually invest the shell (stucco exterior, slip interior) by implosion of the desiccant therewith. The most efficacious mode of imploding the desiccant is to do it by collapsing a fluidized bed of the desiccant after the stuccoed pattern cluster has been immersed therein.

Thus, to continue the disclosure of the preferred embodiment, bone-dry hydrous oxide particles, specifically activated silica gel of about −20+50 mesh size, were presented in a compact bed ready for fluidization by air under pressure. This bed is fluidized by air under pressure passed upward therethrough so that the gel particles are in random motion and the stuccoed shell cluster is immersed in the bed. Since the bed is fluidized, immersion is a soft feathery action without disturbing the integrity of the shell.

The bed is now collapsed simply by disrupting the flow of compressed air, which results in a mild implosion of the desiccant to the extent the stuccoed shell is now squeezed uniformly by the desiccant particles which invest open pores of the stucco coat and penetrate to the slip. This situation is maintained for about 10 minutes to allow for transfer of the film of water from the slip through the stucco overcoat to the bed of desiccant both by capillarity to and adsorption on the desiccant particles.

The bed is now re-fluidized, relaxing the desiccant relative to the cluster so to speak. The cluster is withdrawn from the fluidized bed of desiccant, which being fluidized and relaxed preserves the integrity of the stucco coating, and is ready for a repetition of the foregoing incidental to constructing and drying additional layers of the shell in the same fashion.

Inasmuch as the dwell time for the cluster in the collapsed bed of desiccant is the same for all layers, the present process may be easily automated. Thus, the pattern clusters may be suspended from a conveyor which moves the clusters through a container presenting the slip; thereafter, the clusters still suspended on the conveyor and coated with the slip, may be immersed in a fluidized bed of the stucco particles, following which the clusters are dried by direct contact with a desiccant in accordance with the present invention.

The silica gel is one of several examples of desiccants which may be used and which are deemed compatible with the slip-and-stucco layer, such others including alumina, calcium sulfate and phosphorous pentoxide.

We are thoroughly familiar with other techniques for drying ceramic shells. In fact, we timed many ways in the laboratory which only evidenced the need for a more efficient approach, such other methods including normal air drying and evaporation in a vacuum which were the only ones worth comparing to the desiccant technique of the present invention, but each was less efficient both from the standpoint of time and water removal.

The comparative data are as follows in which I and II signify time for drying the first and second shell layers of a ceramic shell mold constructed from identical slips and stucco coats; the difference was that method A involved air drying (45 percent R.H., 73° F), method B was vacuum evaporation and method C was the desiccant bed above described:

TABLE 1*

| Method | I | %H₂O Removal (I) | II | %H₂O Removal (II) | Total Time To Dry |
|---|---|---|---|---|---|
| A | 60 mins. | 10.3 | 120 mins. | 12.6 | 180 mins. |
| B | 60 mins. | >10.5 but <11.0 | 60 mins. | >10.5 but <11.0 | 120 mins. |
| C | 10–15 min. | 14.7–17.2 | 10–15 min. | 19.0–19.5 | 20–30 min. |

*Theoretical free water content 19.5% max. in all instances

The dry shell (six layers) took a total of only 90 minutes to dry (15 minutes per layer) and data pertinent to the remaining four layers (III, IV, V and VI) are as follows:

| Layer | III | IV | V | VI |
|---|---|---|---|---|
| % H₂O Removal | 16/17 | 11.8/15.1 | 12.1/14.9 | 11.2/13.8 |
| Time Lapse (mins.) | 10/20 | 10/20 | 10/20 | 10/20 |

The final shell is dewaxed in a burn-out furnace operating at 1500° F for 30 minutes. When the shell was sectioned, the interior exhibited no defects whatsoever.

It will be recognized from the foregoing that we develop a unique approach to extracting water progressively from green or uncured shells constituting a shell mold, progressively as the shell is constructed in successive layers consisting of a slip coat and a stucco coat. The procedure is fundamentally physical in that one simply selects a refractory slip and a refractory stucco which mate in the sense of capability, and we then encase this (moist) green shell in a particulate desiccant which in effect sponges the water content, the desiccant remaining as in integral part of the shell layer on which is built the next shell layer ready for a repeat of the drying step effected by collapsing a fluidized bed of desiccant about the shell.

We claim:

1. In the construction of multi-layered shell molds surrounding an expendible pattern, where each layer of the shell is represented by a slip coat interior and a stucco coat exterior applied to the slip, the method of drying each layer after application of the stucco coat by immersing the shell in a fluidized bed of a desiccant, collapsing the bed of desiccant about the shell and holding the bed collapsed for a predetermined period of time during which the desiccant absorb water from the slip coat, and thereafter re-fluidizing the bed of desiccant and withdrawing the shell.

2. A method according to claim 1 where the desiccant in the bed is a material selected from the group consisting of silica gel, alumina, calcium sulfate and phosphorous pentoxide.

3. A method according to claim 2 wherein the slip coat is composed of aqueous colloidal silica having silica particles suspended therein and wherein the stucco coat is a material selected from the group consisting of silica, zircon and alumina-silicate compound.

4. In the construction of multi-layered shell molds surrounding an expendible pattern, where each layer of the shell is represented by a slip coat interior and a stucco coat exterior applied to the slip, the method of drying each layer after application of the stucco coat by surrounding the shell layer with a body of particulate desiccant presented by a fluidized bed of the desiccant, providing relative movement between the shell and the body of desiccant as a whole to drive the particles of desiccant into the pores of the stucco coat, and thereafter withdrawing from the fluidized bed the shell containing particles of desiccant in the pores thereof.

5. A method according to claim 4 where the desiccant in the bed is a material selected from the group consisting of silica gel, alumina, calcium sulfate and phosphorous pentoxide; wherein the slip coat is composed of aqueous colloidal silica having silica particles suspended therein; and wherein the stucco coat is a material selected from the group consisting of silica, zircon and alumina-silicate compound.

* * * * *